(12) United States Patent
Rossini

(10) Patent No.: US 9,989,841 B2
(45) Date of Patent: Jun. 5, 2018

(54) REAR PROJECTION DISPLAY SCREEN AND DEVICE

(71) Applicant: COMMISSARIAT A L'ENERGIE ATOMIQUE ET AUX ENERGIES ALTERNATIVES, Paris (FR)

(72) Inventor: Umberto Rossini, Coublevie (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 102 days.

(21) Appl. No.: 14/831,705

(22) Filed: Aug. 20, 2015

(65) Prior Publication Data

US 2017/0052440 A1    Feb. 23, 2017

(51) Int. Cl.
*G03B 21/60* (2014.01)
*G03B 21/62* (2014.01)
*G02B 5/30* (2006.01)
*G03B 21/608* (2014.01)
*G03B 21/625* (2014.01)
*G03B 21/604* (2014.01)

(52) U.S. Cl.
CPC .......... *G03B 21/62* (2013.01); *G02B 5/3041* (2013.01); *G02B 5/3083* (2013.01); *G03B 21/608* (2013.01); *G03B 21/625* (2013.01); *G03B 21/604* (2013.01)

(58) Field of Classification Search
CPC ......... G03B 21/28; G03B 21/20; G03B 21/00
See application file for complete search history.

(56) References Cited

U.S. PATENT DOCUMENTS

| 5,627,667 | A | 5/1997 | Mizushima |
| 6,362,863 | B1 | 3/2002 | Kataoka |
| 7,167,308 | B1 * | 1/2007 | Krishnamurthy ........ G02B 3/08 |
| | | | 359/457 |
| 2005/0018148 | A1 * | 1/2005 | Hasegawa .......... G02B 27/0018 |
| | | | 353/98 |
| 2005/0078247 | A1 | 4/2005 | Tsuchiya |
| 2005/0270463 | A1 | 12/2005 | Akahane |
| 2014/0016052 | A1 | 1/2014 | Yang |

FOREIGN PATENT DOCUMENTS

| EP | 1762892 A1 | 3/2007 |
| JP | 06265891 A * | 9/1994 |
| JP | 2001249407 A * | 9/2001 |

OTHER PUBLICATIONS

Institut National De La Proriete Industrielle, Rapport de Rechereche Preliminaire for French Application 14/57964, May 15, 2015.

* cited by examiner

Primary Examiner — Sultan Chowdhury
Assistant Examiner — Danell L Owens
(74) Attorney, Agent, or Firm — Kevin R. Erdman; Brannon Sowers & Cracraft PC

(57) ABSTRACT

The present invention involves a rear projection display screen, including at least one assembly including: a film having a surface facing the back of the screen including ridges defining prisms; and an element of controllable refraction index, coating the ridged surface of said film.

13 Claims, 4 Drawing Sheets

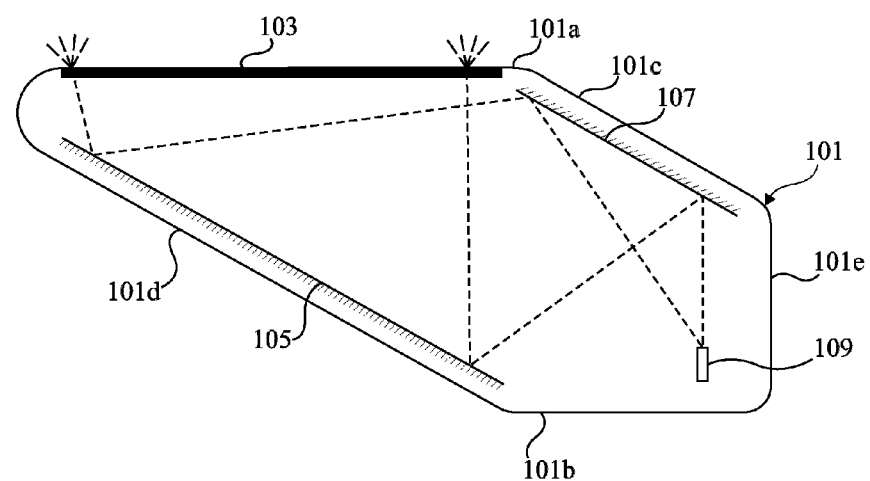
Fig 1
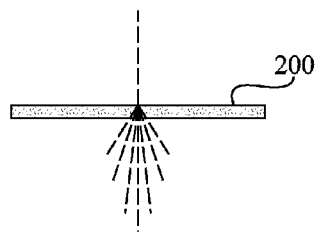
Fig 2
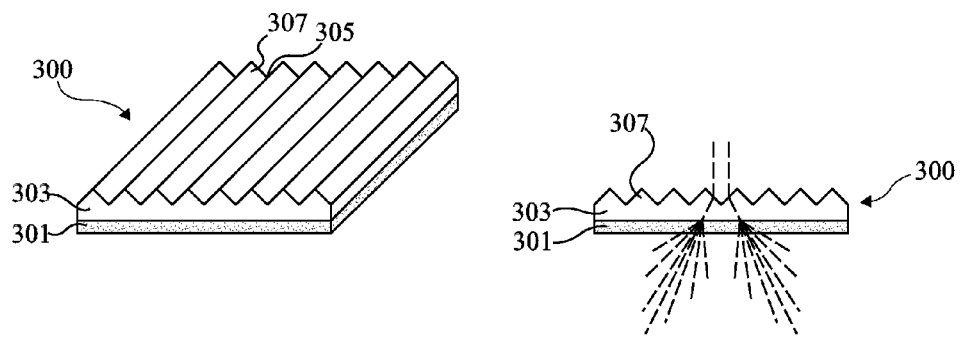
Fig 3A
Fig 3B

REAR PROJECTION DISPLAY SCREEN AND DEVICE

CROSS-REFERENCE TO RELATED APPLICATIONS

The present application claims priority under 35 U.S.C. § 119(e) of French Patent application number 14/57964, filed on Aug. 25, 2014, and European Patent application serial number 15179412.0, filed Jul. 31, 2015, the disclosures of which are incorporated by reference herein.

BACKGROUND OF THE INVENTION

Field of the Invention

The present disclosure relates to a rear projection display screen and to a rear projection display device comprising such a screen. More particularly, the present disclosure relates to a rear projection display screen and device capable of being integrated in a vehicle passenger compartment.

Description of the Related Art

Rear projection designates the projection of images on a surface of a transmissive screen, which will be called hereafter, by convention, the rear surface of the screen, for the viewing of images on the opposite surface of the screen, which will be called front surface of the screen hereafter. It has already been provided to use rear projection display devices to provide information in passenger compartments of vehicles, for example, of cars. Such devices may for example be integrated in the central console of a car, or also above this central console. However, rear projection display devices integrated in vehicle passenger compartments are subject to significant constraints. Such devices should in particular be relatively compact, sufficiently directional to avoid light projections towards reflective elements such as the windshield, and should generate a light flow and an output contrast which are sufficient to avoid problems of readability when the vehicle is placed under a lighting of high luminosity, for example, from the sun. In particular, problems may arise when the image projected on the screen should be able to be seen under an angle different from the normal to the screen, for example, when the screen is located on the central console of a car and the image should be able to be seen by the driver and/or by a front-seat passenger sitting next to the driver.

It would be desirable to have a rear projection display screen and a rear projection display device overcoming all or part of the disadvantages of known rear projection display screens and devices.

SUMMARY

Thus, an embodiment provides a rear projection display device, comprising a screen and a light source, wherein the screen comprises at least one assembly comprising: a film having a surface facing the back of the screen comprising ridges defining prisms; and an element of controllable refraction index, coating the ridged surface of said film, and wherein the light source is capable of projecting an image on the rear surface of the screen.

According to an embodiment, the element may be controlled to be in a first state where it has a refraction index equal, to within better than 5%, to the refraction index of the film, and to be in a second state where it has a refraction index smaller by more than 20% than the refraction index of the film.

According to an embodiment, the element has a first surface following the ridged surface of said film, and a second surface opposite to the first surface, approximately parallel to the mean plane of the screen.

According to an embodiment, the prisms have, in cross-section, the shape of isosceles triangles or of right-angled triangles.

According to an embodiment, the screen further comprises a diffuser located on the non-ridged surface side of said film.

According to an embodiment, the screen further comprises a linear polarizer and a quarter-wave plate located on the non-ridged surface side of said film.

According to an embodiment, the screen comprises a plurality of stacked assemblies, the prisms of the different assemblies having, in cross-section, different shapes.

According to an embodiment, the element is a sealed volume into which a fluid can be introduced or from which said fluid can be removed to modify the refraction index of the volume.

According to an embodiment, the fluid has a refraction index equal, to within better than 5%, to the refraction index of the film.

According to an embodiment, the fluid is an oil.

According to an embodiment, the screen further comprises a device for filling and emptying the volume.

According to an embodiment, the element is a liquid crystal layer having a refraction index which can be modified by application of an electric field.

According to an embodiment, the screen further comprises two electrodes arranged on either side of said layer, and a control circuit enabling to apply between said electrodes a bias voltage capable of modifying the refraction index of said layer.

According to an embodiment, the device further comprises a Fresnel lens between the source and the screen.

In several embodiments, rear projection display device comprises a screen (400; 900) and a light source, wherein the screen (400; 900) comprises at least one assembly comprising: a film (403) having a surface facing the back of the screen comprising ridges defining prisms (407); and an element (409; 909) having a controllable refraction index, coating the ridged surface of the film (403), wherein the light source is configured for projecting an image on the rear surface of the screen. The element (409; 909) may be controlled to be in a first state where it may have a refraction index (n0) equal, to within better than 5%, to the refraction index of said film (403), and in a second state where it may have a refraction index smaller by more than 20% than the refraction index of the film (403). The element (409; 909) may have a first surface following the ridged surface of said film (403), and a second surface opposite to the first surface, approximately parallel to the mean plane of the screen. The prisms (407) may have, in cross-section, the shape of isosceles triangles or of right-angled triangles. The screen (400; 900) may further comprise a diffuser (401) located on the non-ridged surface side of the film (403). The screen (400; 900) may further comprise a linear polarizer (803) and a quarter-wave plate (801) located on the non-ridged surface side of the film (403). The screen (400; 900) may comprise a plurality of stacked assemblies, the prisms (407i) of the different assemblies having, in cross-section, different shapes. The element (409) may be a sealed volume into which a fluid (411) may be introduced or from which said fluid may be removed to modify the refraction index of the volume. The fluid (411) may have a refraction index (n0) equal, to within better than 5%, to the refraction index of the film (403), and may be oil. The screen (400) may further comprise a device (601, 603, 605) for filling and emptying the volume (409). The element (909) may be a liquid crystal layer having a refraction index which may be modified by application of an electric field. The screen (900) may further comprise two electrodes (913, 915) arranged on either side of the layer (909), and a control circuit (917) enabling to apply between the electrodes a bias voltage capable of modifying the refraction index of the layer (909). The device may further comprise a Fresnel lens (420) between the light source and the screen (400; 900).

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a simplified cross-section view of an example of a rear projection display device;

FIG. 2 is a simplified cross-section view of an example of a rear projection display screen;

FIGS. 3A to 3C schematically show another example of a rear projection display screen;

For clarity, the same elements have been designated with the same reference numerals in the various drawings and, further, the various drawings are not to scale.

Figure 3C:
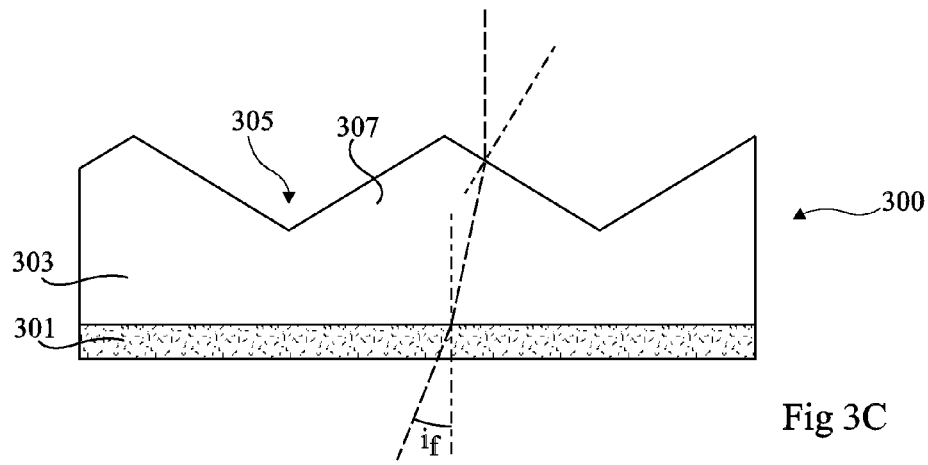

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below is/are not intended to be exhaustive or limit the invention to the precise form disclosed in the following detailed description. Rather, the embodiment is chosen and described so that others skilled in the art may utilize its teachings.

FIG. 1 is a simplified cross-section view of an example of a rear projection display device capable of being integrated in the passenger compartment of a vehicle, for example, in the central console of a motor vehicle.

The device of FIG. 1 comprises a package 101 defining an enclosure having projection elements of the device integrated therein. In this example, package 101 has the general shape of a parallelepiped truncated along a plane parallel to one of its edges. In FIG. 1, five walls 101a, 101b, 101c, 101d, and 101e of package 101 can be seen. Wall 101a corresponds to a first surface of the parallelepiped, wall 101b corresponds to a second truncated surface of the parallelepiped, parallel to wall 101a, wall 101c corresponds to a third truncated surface of the parallelepiped, forming an obtuse angle with wall 101a, and wall 101d corresponds to a fourth surface of the parallelepiped, parallel to wall 101c, forming an acute angle with wall 101a. Wall 101e connects wall 101b to wall 101c in the parallelepiped truncating plane and forms, in this example, an approximately straight angle with wall 101b.

Package 101 comprises an outlet opening in wall 101a, having a rear projection display screen 103 positioned therein. The rear surface of screen 103, intended to receive an image projected by a light source, faces the inside of package 101, while its front surface, intended to be seen by a user, is directed towards the outside of the package.

Inside of the package are arranged two planar reflective mirrors 105 and 107 respectively positioned along wall 101d and along wall 101c, and a light source 109, for example, a mobile laser scanning source, a miniaturized LED video projector, etc., approximately positioned in the angle between walls 101b and 101e. Source 109 is arranged to illuminate mirror 107, so that the beam reflected by mirror 107 reaches mirror 105 and that the beam reflected by mirror 105 illuminates the rear surface of screen 103.

FIG. 2 is a cross-section view schematically showing an example of a rear projection display screen 200. Screen 200 is essentially formed of a transmissive diffuser, that is, a sheet, plate, or film transmitting to its front surface the light illuminating its rear surface, by more or less strongly diffusing this light. Generally, the output cone of the diffuser is centered on the propagation direction of the light illuminating its rear surface, that is, when the diffuser receives, on its rear surface side, a light beam under a normal incidence, the intensity of the beam emitted by the diffuser on its front surface side is maximum along an axis normal to the screen, and decreases as the propagation angle of the diffused light deviates from the normal to the screen.

In a rear projection display device integrated in the central console of the passenger compartment of a vehicle, a problem which arises is that the image should be able to be seen under an angle different from the normal to the screen, for example, by the driver or by both the driver and a front-seat passenger. When a screen of the type described in relation with FIG. 2 is used, in order for the image perceived by the driver and/or the front-seat passenger to be sufficiently bright, a relatively strong light source and a diffusing screen having its output cone exhibiting a relatively large angular aperture (or diffusion angle), for example, greater than or equal to 80° in the horizontal plane (as an example, the angle between the driver and the front-seat passenger is approximately 60° in the horizontal plane, and the driver and the front-seat passenger should each see a cone with an angular aperture of approximately 20° in the horizontal plane)

should be provided. This results in a significant electric power consumption. Further, parasitic reflections capable of disturbing the driver may occur. Indeed, when a diffuser having an output cone of wide angular aperture (for example, greater than or equal to 80°) is desired to be formed, the edges of the diffuser emission cone are generally not sharp. As a result, a non-negligible part of the light is deviated outside of the targeted output cone, that is, towards the lateral windows of the vehicle.

FIGS. 3A to 3C schematically show another example of a rear projection display screen 300. FIG. 3A is a perspective view of screen 300, FIG. 3B is a cross-section view of screen 300, and FIG. 3C is an enlarged partial cross-section view of screen 300. Screen 300 further comprises a transmissive diffuser 301 of the type described in relation with FIG. 2. Screen 300 further comprises, placed against the rear surface of diffuser 301, a transparent film 303 having its surface opposite to diffuser 301 (that is, the surface facing the light source or rear surface) comprising ridges 305 having a triangular cross-section defining prisms 307. In the shown example, ridges 305 are parallel and extend across the entire width of screen 300 with a constant pitch. In this example, prisms 307 defined between the lateral walls of ridges 305 are all substantially identical and have, in cross-section, the shape of isosceles triangles. In this example, the bases of prisms 307 (bases of the isosceles triangles) define a continuous planar surface parallel to diffuser 301 and having dimensions substantially identical to those of diffuser 301.

When an image is projected onto the rear surface of screen 300, if the pitch of the prisms is small enough with respect to the image resolution, for each of the image pixels, part of the light corresponding to the pixel is deviated leftwards by an angle if (in the orientation of FIGS. 3B and 3C), and the remaining part is deviated rightwards by an angle if (in the orientation of FIGS. 3B and 3C). At the output of diffuser 301, the light corresponding to a given pixel of the image is thus distributed between two diffusion cones centered on distinct axes which are not orthogonal to the screen.

The use of a screen with prisms of the type described in relation with FIGS. 3A to 3C in a rear projection display device integrated in the central console of the passenger compartment of a vehicle enables to make the image projected on the screen visible both by the driver and by the passenger, with an improved efficiency between the power emitted by the light source and the luminosity perceived by the user as compared with devices using a screen of the type described in relation with FIG. 2. An advantage is that the total light power emitted at the diffuser outlet can be decreased. Further, the diffusion angle of diffuser 301 may be decreased with respect to a screen of the type described in relation with FIG. 2. As an example, the diffusion angle of diffuser 301 may be selected to be smaller than or equal to 30°, or even 20°, in the horizontal plane. This enables to limit risks of parasitic reflections capable of disturbing the driver. It should in particular be noted that the fact of deviating the light in the desired directions before diffusing it with a diffuser having a low angle of aperture provides a sharp cut of the edges of the diffusion cone, thus limiting risks of parasitic reflections, particularly on the lateral windows of the vehicle.

In a rear projection display device using such a screen, an optical system (not shown in FIGS. 3A to 3C) enabling to control the angle of incidence of the light projected on the screen, for example, a Fresnel lens, may be provided between the projection elements and the rear surface of the screen.

A disadvantage of a rear projection display device using a screen of the type described in relation with FIGS. 3A to 3C is that it does not enable to view the projected images under an angle normal to the screen. In particular, when such a device is integrated in the central console of a vehicle passenger compartment, the projected images are not visible by a back-seat passenger located at the center of the vehicle.

It would be desirable to have a rear projection display device capable of being controlled to select one or a plurality of preferred angles of projection of the images from among a set of at least two configurations (for example, a first configuration where the projected images are visible only by the lateral front-seat passengers, and a second configuration where the projected images are visible only by one or a plurality of back-seat passengers approximately placed at the center of the vehicle). This would for example enable to adapt the projection mode according to the number of passengers and to their positions in the vehicle.

Figure 4:
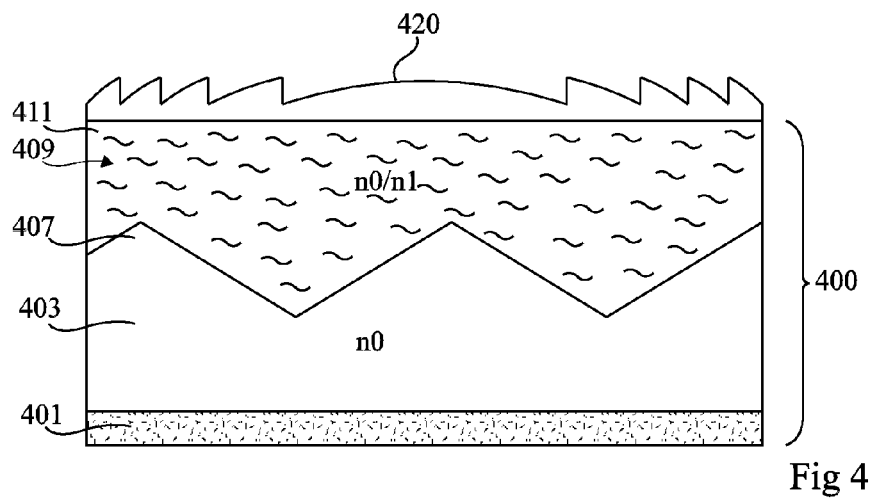
FIG. 4 is a partial simplified cross-section view showing a first embodiment of a rear projection display device.

FIG. 4 is a partial simplified cross-section view showing an embodiment of a rear projection display device. In particular, FIG. 4 comprises a partial simplified cross-section view of an embodiment of a rear projection display screen 400.

Screen 400 of the display device of FIG. 4 comprises a transmissive diffuser 401. As an example, diffuser 401 may be a cylindrical lenticular diffuser of the type described in article "A dual-directional light-control film with a high-sag and high-asymmetrical-shape microlens array fabricated by a UV imprinting process" of Ta-Wei Lin et al. The provision of such a diffuser has the advantage of decreasing speckle phenomena when the light source of the display device is a source with a strong light coherence, for example, a laser source. Other types of diffusers may however be used, for example, a diffuser of the type sold by LUMINIT under name "Light Shaping Diffuser". Diffuser 401 preferably has a relatively low diffusion angle, for example, smaller than or equal to 30°, and preferably smaller than or equal to 20° in the horizontal plane. As a non-limiting illustrative example, the diffusion angle of diffuser 401 in the vertical plane may be in the range from 20 to 30°.

Screen 400 thus comprises, coating the rear surface of diffuser 401, a film 403 made of transparent material, having its surface opposite to diffuser 401 (or rear surface) comprising ridges with a triangular cross-section defining prisms 407. In the shown example, the ridges are parallel and extend across the entire width of screen 400, with a constant pitch. In this example, prisms 407 defined between the lateral walls of the ridges are all substantially identical and have, in cross-section, the shape of isosceles triangles. In this example, the bases of prisms 407 define a continuous planar surface parallel to diffuser 401 and having dimensions substantially identical to those of diffuser 401. As an example, the pitch between neighboring prisms, corresponding in this example to the width of the prism base, may be in the range from 20 to 200 micrometers. Film 403 is for example a film made of or containing polyethylene terephthalate (PET), embossed on its rear surface side according to a pattern corresponding to the shape of prisms 407. Other materials and/or forming methods may however be provided to form prisms 407. As an example, prisms 407 may be formed by etching. A thin layer of glue, not shown, may be provided between the rear surface of diffuser 401 and the front surface of film 403.

Screen 400 further comprises, coating the rear surface of film 403, a transparent element 409 having a controllable refraction index. In this example, on its front surface side, element 409 takes the shape of the surface in triangles of film 403, and, on its rear surface side, element 409 is approximately planar and parallel to diffuser 401. In the example of FIG. 4, the largest thickness of element 409 is greater than the height of prisms 407, that is, the rear surface of element 409 is located at the back of the screen with respect to the plane containing the top edges of prisms 407.

According to an aspect of the embodiment of FIG. 4, element 409 is a sealed volume into which a transparent fluid 411 can be introduced or from which said fluid can be removed to modify the refraction index of the volume. In this example, fluid 411 has a refraction index n0 substantially equal to the refraction index of film 403, for example equal, to within 5% and preferably to within 1%, to the refraction index of film 403. Refraction index n0 of fluid 411 is for example in the range from 1.5 to 1.65. Fluid 411 is for example a liquid, for example, an oil. In the absence of fluid 411, volume 409 is for example filled with air, and has a refraction index n1 smaller than the refraction index of film 403, for example, smaller by more than 20% than the refraction index of film 403.

In the example of FIG. 4, the display device further comprises an optical system 420 capable of controlling the angle of incidence, on screen 400, of the light rays projected by the source (not shown). In this example, optical system 420 is such that all the light rays projected by the source reach the rear surface of the screen under an approximately normal incidence (orthogonally to diffuser 401). In this example, optical system 420 comprises a Fresnel lens arranged against the rear surface of element 409. More particularly, in the shown example, the front surface of Fresnel lens 420 and the rear surface of film 403 form the main walls of a tight enclosure delimiting volume 409. Peripheral seals, not shown, may be provided to laterally close the enclosure delimiting volume 409. Spacers, not shown, may further be provided to maintain a non-zero distance between the front surface of Fresnel lens 420 and the top edges of prisms 407. In practice, to make the assembly easier, a transparent blade, not shown, for example, made of glass, may form an interface between optical element 420 and volume 409, the front surface of this blade then forming the back wall of the enclosure delimiting volume 409. Further, as a variation, an interface layer (not shown) of low wettability, for example, made of polytetrafluoroethylene (PTFE) or of polydimethylsiloxane (PDMS), may coat the internal walls of the enclosure delimiting volume 409, to make the removal of fluid 411 without leaving droplets easier. The interface layer may further have antireflection properties, to avoid certain parasitic reflections when fluid 411 is absent. The thickness of this interface layer is preferably relatively thin, for example, with a thickness smaller than 10 µm and preferably smaller than 1 µm, to avoid having a significant influence on the light projected by the source.

The display device of FIG. 4 further comprises a mechanism (not shown in FIG. 4) capable of being controlled to fill volume 409 with fluid 411, or to empty volume 409.

When volume 409 is filled with fluid 411, the refraction index of volume 409 is substantially equal to refraction index n0 of film 403. The diopter formed at the interface between element 409 and film 403 is then inactive, and prisms 407 do not deviate the light projected by the light source of the device. The projected images are then only visible if the observer is placed in front of the screen, in the diffusion cone of diffuser 401. As an example, in the case of a rear projection display device integrated at the level of the central console of a vehicle passenger compartment, the projected images are only visible by one or a plurality of passengers of the vehicle located substantially at the center of the vehicle (for example, back-seat passengers) and are not or only faintly visible by passengers located on either side of the console (for example, the driver and the front-seat passenger).

When fluid 411 is not present in volume 409, refraction index n1 of volume 409 is different from refraction index n0 of film 403. The diopter formed at the interface between element 409 and film 403 is then active, and prisms 407 laterally deviate (to the left and to the right in the orientation of the drawing) the light projected by the light source of the device, by an angle which depends on the inclination of the lateral surfaces of the prisms, and of indexes n0 and n1. In the case of a device intended to be integrated in the central console of an automobile vehicle, it is for example provided to use a film 403 and an element 409 of respective indexes n0 and n1 enabling to obtain an angle if adapted to the visualization of the image both by the driver and by the front-seat passenger, for example, an angle in the range from 10 to 30 degrees. The projected images are then only visible by the driver and the front-seat passenger, and are not or only slightly visible by passengers located at the center of the vehicle.

Figure 5:
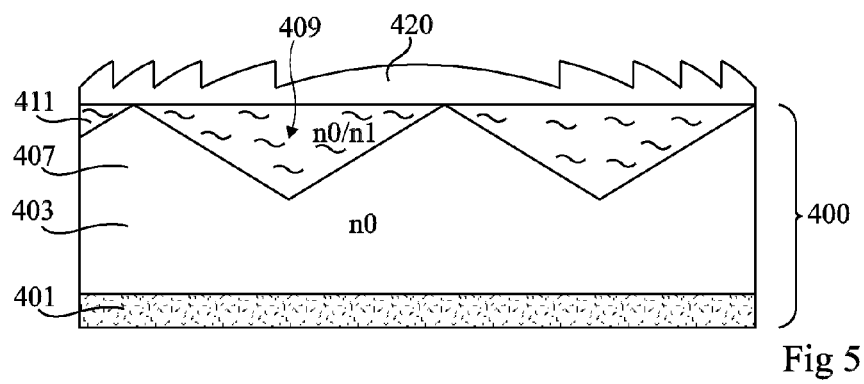
FIG. 5 is a partial simplified cross-section view showing an alternative embodiment of the rear projection display device of FIG. 4.

FIG. 5 is a partial simplified cross-section view showing an alternative embodiment of the rear projection display device of FIG. 4, and more particularly of screen 400 of FIG. 4.

Screen 400 of FIG. 5 differs from screen 400 of FIG. 4 in that, in the example of FIG. 5, the largest thickness of element 409 is equal to the height of prisms 407, that is, the rear surface of element 409 coincides with the plane containing the top edges of prisms 407.

The operation of the display screen and device of FIG. 5 is identical or similar to what has been described in relation with FIG. 4.

An advantage of the example of FIG. 5 is that the tops of prisms 407 are used as a bearing point for the element forming the back wall of the enclosure delimiting volume 409 (the front surface of Fresnel lens 420 in the shown example). This enables to do without spacers between film 403 and optical system 420, thus making the device manufacturing easier.

Figure 6:
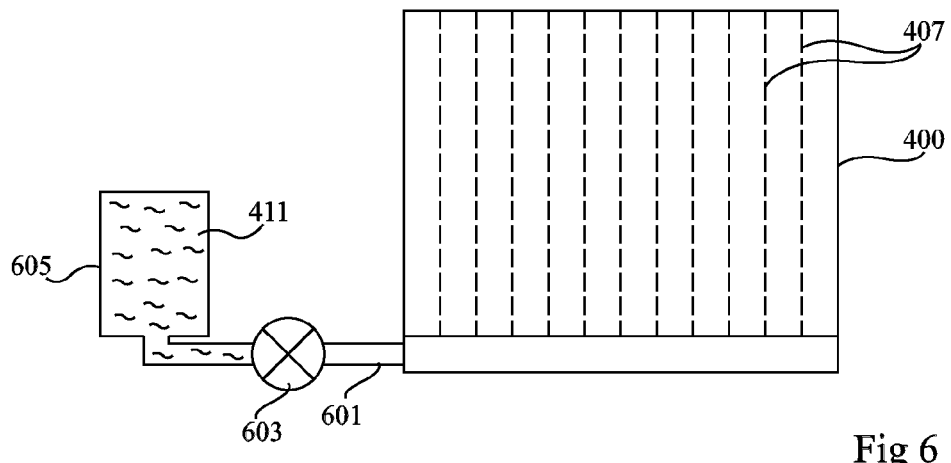
FIG. 6 is a partial simplified top view showing an embodiment of a rear projection display device of the type described in relation with FIGS. 4 and 5.

FIG. 6 is a partial simplified representation of an embodiment of a rear projection display device of the type described in relation with FIGS. 4 and 5. More particularly, FIG. 6 schematically shows screen 400, in front view, and an example of a mechanism capable of being controlled to fill volume 409 with fluid 411, or to remove fluid 411 from volume 409.

In FIG. 6, screen 400 has been very schematically shown by a rectangle. The different elements forming the screen, and in particular element 409, have not been shown. Only the edges of prisms 407 of the screen have been schematically shown with dash lines.

In the example of FIG. 6, the mechanism for controlling the refraction index of element 409 comprises a pump 603 coupling a tank 605 adapted to contain fluid 411 to an element 601 for injecting/extracting fluid 411 into/from volume 409. In the shown example, element 601 is an injection/extraction pipe enabling to fill/empty in parallel the different ridges formed in film 403.

Given the relatively small thickness of volume 409, pump 603 may advantageously be a low-bulk pump, for example, a piston-diaphragm pump of the type generally used in laundry irons, steam cookers, soap dispensers, etc. As an example, for a use in a motor vehicle console, a satisfactory switching time (typically shorter than 10 seconds) can be obtained with a pump having a flow in the range from 5 to 50 ml/min, for a device where the ridge length is in the order of 10 cm, the equivalent circular cross-section of the ridges has a diameter in the order of 28 µm, and the viscosity of the fluid is similar or identical to the viscosity of water, that is, in the order of 10-3 Pa·s.

Figure 7:
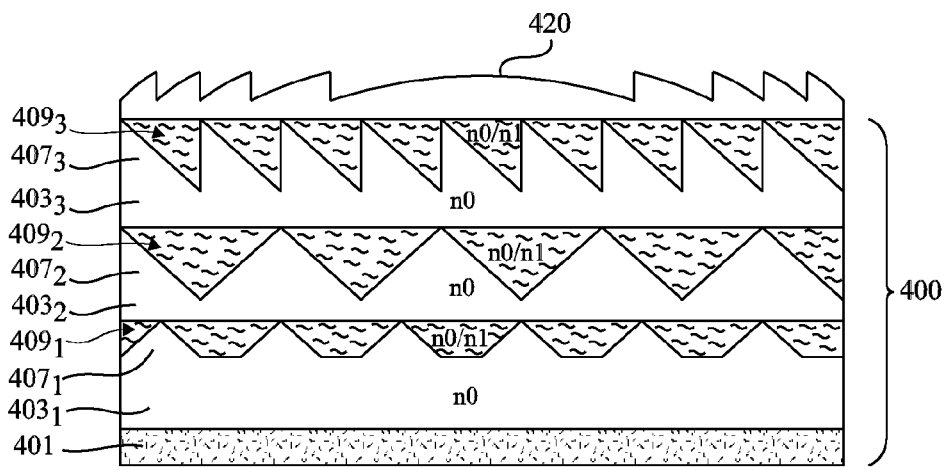
FIG. 7 is a partial simplified cross-section view showing an alternative embodiment of a rear projection display device of the type described in relation with FIGS. 4 to 6.

FIG. 7 is a partial simplified cross-section view showing an alternative embodiment of a rear projection display device of the type described in relation with FIGS. 4 to 6, and more particularly of screen 400 of this device.

In the examples of FIGS. 4 to 6, screen 400 comprises an assembly of a ridged film 403 and of an element 409 having a controllable refraction index enabling to activate or not the optical function of film 403. Screen 400 of FIG. 7 differs from the screens of FIGS. 4 to 6 in that instead of a single assembly, it comprises three stacked assemblies, capable of implementing three different functions of distribution of the projected light. Each assembly comprises a film 403$i$ of the type described in relation with FIGS. 4 to 6, having ridges on its rear surface side, and an element 409$i$ of controllable refraction index of the type described in relation with FIGS. 4 to 6, coating the rear surface of film 403$i$ and enabling to activate/deactivate the optical function of film 403$i$ (i being an integer in the range from 1 to 3).

Film 4031 has an advantageously planar front surface, placed against the rear surface of diffuser 401, and a ridged rear surface. In this example, the ridges formed on the rear surface side of film 4031 have, in cross-section, a trapezoid shape, for example, an isosceles trapezoid shape. Thus, the rear surface of film 4031 comprises prisms 4071, and approximately planar areas parallel to the front surface of the film, separating prisms 4071 two by two. In the active state (that is, in the absence of fluid 411 in volume 4091), film 4031 enables to deviate to the left (in the orientation of the drawing) a first part of the projected light, and to transmit with not deviation the rest of the projected light. In the case of a device integrated at the level of the central console of a vehicle passenger compartment, film 4031 for example enables to make the projected images visible both by the driver and the front-seat passenger, and by one or a plurality of back-seat passengers located substantially at the center of the vehicle.

Film 4032 has an approximately planar front surface, forming in this example the back wall of the enclosure delimiting volume 4091, and a ridged rear surface. In this example, the ridges of film 4032 are ridges having a triangular section, identical or similar to the ridges of film 403 described in relation with FIGS. 4 and 5, defining prisms 4072 identical or similar to prisms 407 of the examples of FIGS. 4 and 5. In the active state (in the absence of fluid 411 in volume 4092), film 4032 enables to deviate to the left (in the orientation of the drawing) part of the projected light, and to deviate to the right (in the orientation of the drawing) the rest of the projected light. In the case of a device integrated in the central console of a vehicle passenger compartment, film 4032 for example enables to make the projected images visible by both the driver and the front-seat passenger, and invisible by the back-seat passengers.

Film 4033 has an approximately planar front surface, forming in this example the back wall of the enclosure delimiting volume 4092, and a ridged rear surface. In this example, the ridges of film 4033 are ridges having a right-angled triangle cross-section, defining triangular prisms 4073 of the type described in relation with FIGS. 4 and 5, but having a single inclined lateral surface, the other lateral surface of the prism being approximately orthogonal to its base. In the active state (in the absence of fluid 411 in volume 4093), film 4033 enables to deviate to the left (in the orientation of the drawing) the entire projected light. In the case of a device integrated at the level of the central console of a vehicle passenger compartment, film 4033 for example enables to make the projected images visible by the driver only.

In the example of FIG. 7, the back wall of the enclosure delimiting volume 4093 corresponds to the front surface of optical system 420.

The display device of FIG. 7 may comprise three different control mechanisms of the type described in relation with FIG. 6, respectively coupled to elements 4091, 4092, and 4093. As a variation, a control mechanism common to the three assemblies, comprising a single pump, may be provided to control the filling and the emptying of elements 4091, 4092, and 4093.

An advantage of screen 400 of FIG. 7 is that it provides a larger number of projection configurations than a screen of the type described in relation with FIGS. 4 to 6. According to the envisaged application, a number of stacked film 403$i$/element 409$i$ assemblies different than three may be selected.

Figure 8:
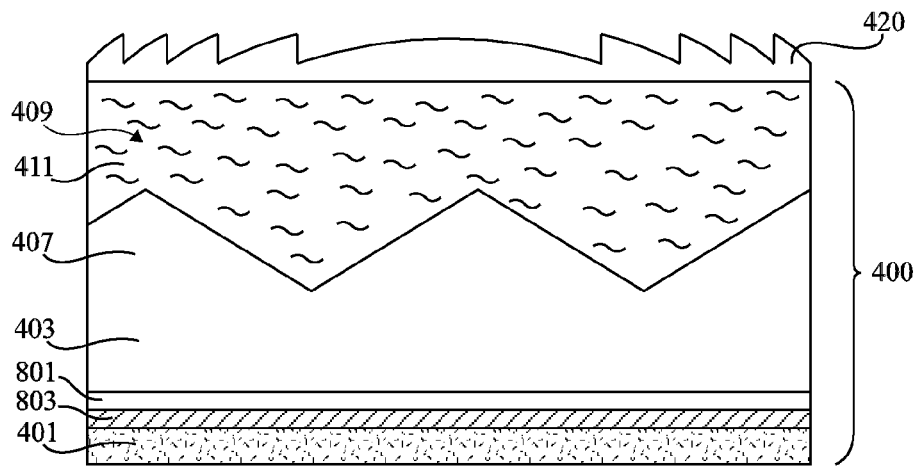
FIG. 8 is a partial simplified cross-section view showing another alternative embodiment of a rear projection display device of the type described in relation with FIGS. 4 to 7.

FIG. 8 is a partial simplified cross-section view showing another alternative embodiment of a rear projection display device of the type described in relation with FIGS. 4 to 7, and more particularly of screen 400 of such a device.

In the example of FIG. 8, screen 400 comprises the same elements as screen 400 of FIG. 4, but differs from the screen of FIG. 4 in that it further comprises, between the front surface of film 403 and the rear surface of diffuser 401, a quarter-wave plate 801 and a polarizer 803. Quarter-wave plate 801 is placed against the front surface of film 403, and polarizer 803 is arranged between quarter-wave plate 801 and diffuser 401. Quarter-wave plate 801 is preferably oriented so that its neutral axes form an angle of approximately 45 degrees, for example, an angle in the range from 40 to 50 degrees, with the polarization direction of polarizer 803. The provision of the stack formed by beam splitter 801 and polarizer 803 enables to improve the contrast of the display device. Indeed, the stack formed by beam splitter 801 and polarizer 803 substantially filters half of the light crossing it (in one direction or in the other). However, the light projected by the light source crosses stack 801-803 only once, while the back-scattered parasitic light—that is, the light originating from the outside of the device, for example, from the sun, which crosses the screen from its front surface to its rear surface, reflects inside of the device, and then crosses back the screen from the rear surface to its front surface—is filtered twice by stack 801-803. The back-scattered light is thus more strongly attenuated than the useful light, projected by the light source, which improves the contrast. It should be noted that the alternative embodiment of FIG. 8 may be combined with the variations of FIGS. 5 and 7.

Figure 9:
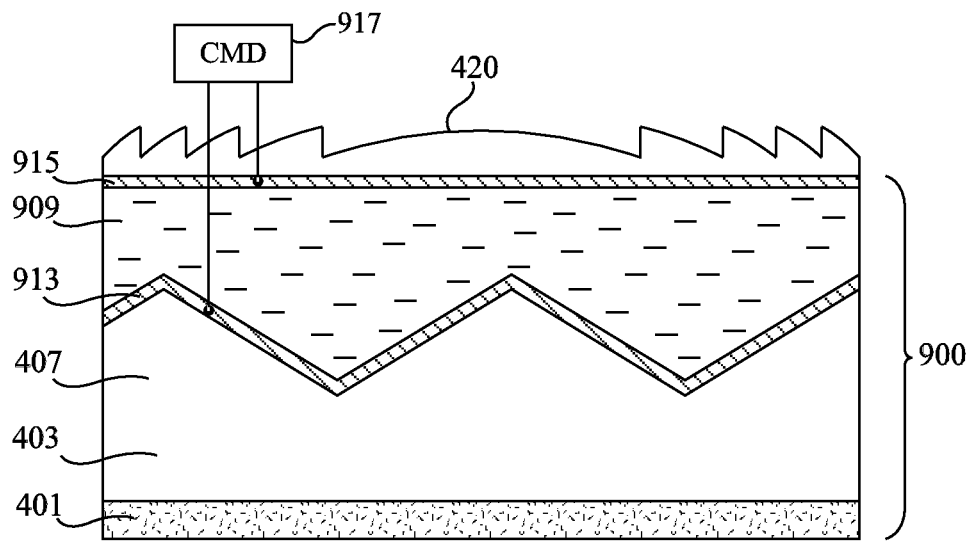
FIG. 9 is a partial simplified cross-section view showing a second embodiment of a rear projection display device.

FIG. 9 is a partial simplified cross-section view showing another embodiment of a rear projection display device. In particular, FIG. 9 comprises a partial simplified cross-section view of an embodiment of a rear projection display screen 900.

Screen 900 of the display device of FIG. 9 comprises a transmissive diffuser 401, for example, identical or similar to that of screen 400 of FIG. 4. Screen 900 further comprises, coating the rear surface of diffuser 401, a film 403 made of a transparent material, having its surface opposite to diffuser 401 (or rear surface) comprises ridges of triangular cross-section defining prisms 407. Film 403 of screen 900 is for example identical or similar to film 403 of screen 400 of FIG. 4.

Screen 900 further comprises, coating the rear surface of film 403, a transparent element 909 having a controllable refraction index. In this example, on its front surface side, element 909 takes shape of the surface in triangles of film 403, and, on its rear surface side, element 909 is approximately planar and parallel to diffuser 401. In the example of FIG. 9, the largest thickness of element 909 is greater than the height of prisms 407, that is, the rear surface of element 909 is located at the back of the screen with respect to the plane containing the top edges of prisms 407.

According to an aspect of the embodiment of FIG. 9, element 909 is a liquid crystal layer having a refraction index which can be controlled, via two transparent electrodes 913 and 915, to take one or the other of two values n0 and n1. More particularly, in this example, value n0 is approximately equal to the refraction index of film 403, for example equal, to within 5% and preferably to within 1%, to the refraction index of film 403, and value n1 is smaller than the refraction index of film 403, for example, smaller by more than 20% than the refraction index of film 403. Values n0 and n1 for example respectively correspond to the ordinary index and to the extraordinary index of the liquid crystal.

In the example of FIG. 9, the display device further comprises an optical system 420 capable of controlling the angle of incidence, on screen 900, of the light rays projected by the source (not shown). Optical system 420 of the device of FIG. 9 is for example identical or similar to optical system 420 of the device of FIG. 4.

In the example of FIG. 9, electrode 913 is arranged between the rear surface of film 403 and the front surface of layer 909, following the structured contour of the rear surface of film 403, and electrode 915 is arranged between the rear surface of layer 909 and the front surface of optical system 420, and is approximately planar and parallel to diffuser 401.

The display device of FIG. 9 further comprises a control circuit 917 (CMD), enabling to apply between electrodes 913 and 915 a voltage capable of controlling the state of the crystals of layer 909 to modify the refraction index of layer 909. More particularly, in this example, control circuit 917 is capable of applying between electrodes 913 and 915 two different voltage levels, respectively corresponding to the setting to the state of index n0 of layer 909 and to the setting to the state of index n1 of layer 909.

When element 909 is at the state of index n0, the diopter formed at the interface between element 909 and film 403 is inactive, and prisms 407 do not deviate the light projected by the light source of the device. When element 909 is at the state of index n1, the diopter formed at the interface between element 909 and film 403 is active, and prisms 407 laterally deviate (to the left and to the right in the orientation of the drawing) the light projected by the light source of the device, by an angle which depends on the inclination of the lateral surfaces of the prisms, and on indexes n0 and n1.

It should be noted that the light source (not shown in FIG. 9) of the rear projection display device may be polarized. In this case, the liquid crystals of layer 909 are preferably aligned so that the refraction index modification of layer 909 (when an appropriate control voltage is applied between electrodes 913 and 915), affects the light emitted by the source. The alignment may be obtained by friction of an alignment agent based on polyimide, or by means of a polyimide-based alignment agent which aligns by illumination.

Figure 10:
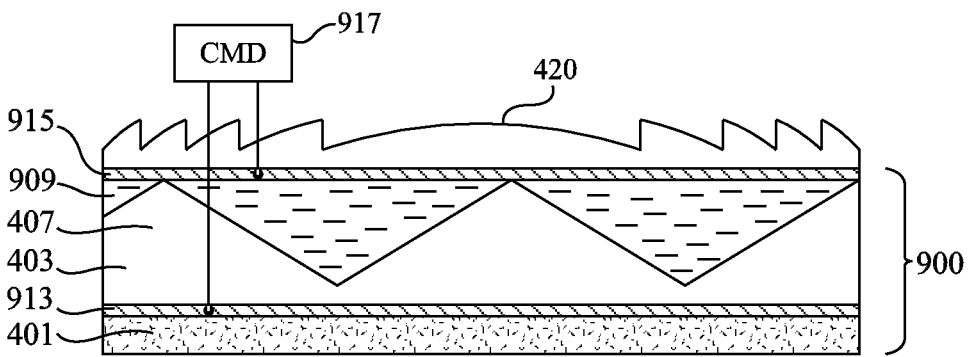
FIG. 10 is a partial simplified cross-section view showing an alternative embodiment of the rear projection display device of FIG. 9.

FIG. 10 is a partial simplified cross-section view showing an alternative embodiment of the rear projection display device of FIG. 9, and more particularly of screen 900 of FIG. 9.

Screen 900 of FIG. 10 differs from screen 900 of FIG. 9 in that, in the example of FIG. 10, the largest thickness of element 909 is equal to the height of prisms 407, that is, the rear surface of element 909 approximately coincides with the plane containing the top edges of prisms 407. Further, screen 900 of FIG. 10 differs from screen 900 of FIG. 9 in that, in the example of FIG. 10, electrode 913 is approximately planar and is arranged between the rear surface of diffuser 401 and the front surface of film 403. In this example, electrode 913 is thus not in contact with layer 909.

The operation of the display screen and device of FIG. 10 is identical or similar to what has been described in relation with FIG. 9.

Screen 900 of FIG. 10 has the advantage of being particularly easy to manufacture.

Specific embodiments have been described. Various alterations, modifications, and improvements will readily occur to those skilled in the art.

In particular, the above-described embodiments are compatible not only with planar screens, but also with screens having curved shapes.

Further, based on the above-described embodiments, it will be within the abilities of those skilled in the art, without showing any inventive step, to add layers, sheets, films, or additional plates to the screen stack, to implement other functions, for example, one or a plurality of antireflection layers.

Further, embodiments of screens comprising a plurality of stacked elements have been described. The described embodiments are not limited to the above-mentioned embodiments of the various screen elements. It should be understood that each screen element, and particularly film 403, may be made in the form of a sheet, of a layer, of a film, of a plate, etc.

Further, various embodiments with different variations have been described hereabove. It should be noted that those skilled in the art may combine various elements of these various embodiments and variations without showing any inventive step.

In particular, the alternative embodiments described in relation with FIGS. 7 and 8 can easily be adapted to the embodiment described in relation with FIGS. 9 and 10.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A rear projection display device, comprising a screen and a light source, wherein the screen comprises at least one assembly comprising:
    a film having a surface facing the back of the screen comprising ridges defining prisms; and
    an element having a controllable refraction index, coating the ridged surface of said film, wherein the light source is configured for projecting an image on the rear surface of the screen;
wherein the screen further comprises a diffuser located on the non-ridged surface side of said film.

2. The rear projection display device of claim 1, wherein said element may be controlled to be in a first state where it has a refraction index equal, to within better than 5%, to the refraction index of said film, and in a second state where it has a refraction index smaller by more than 20% than the refraction index of said film.

3. The rear projection display device of claim 1, wherein said element has a first surface following the ridged surface of said film, and a second surface opposite to the first surface, approximately parallel to the mean plane of the screen.

4. The rear projection display device of claim 1, wherein the prisms have, in cross-section, the shape of isosceles triangles or of right-angled triangles.

5. The rear projection display device of claim 1, wherein the screen further comprises a linear polarizer and a quarter-wave plate located on the non-ridged surface side of said film.

6. The rear projection display device of claim 1, wherein the screen comprises a plurality of stacked assemblies, the prisms of the different assemblies having, in cross-section, different shapes.

7. The rear projection display device of claim 1, wherein said element a sealed volume into which a fluid can be introduced or from which said fluid can be removed to modify the refraction index of the volume.

8. The rear projection display device of claim 7, wherein the fluid has a refraction index equal, to within better than 5%, to the refraction index of said film.

9. The rear projection display device of claim 7, wherein the fluid is an oil.

10. The rear projection display device of claim 7, wherein the screen further comprises a device for filling and emptying said volume.

11. The rear projection display device of claim 1, wherein said element is a liquid crystal layer having a refraction index which can be modified by application of an electric field.

12. The rear projection display device of claim 11, wherein the screen further comprises two electrodes arranged on either side of said layer, and a control circuit enabling to apply between said electrodes a bias voltage capable of modifying the refraction index of said layer.

13. The rear projection display device of claim 1, further comprising a Fresnel lens between the light source and the screen.

* * * * *